United States Patent Office 3,449,406
Patented June 10, 1969

3,449,406
PROCESS FOR PREPARING OF ALIPHATIC MONOCARBAMATES
Henry G. Goodman, Jr., White Plains, and Carol A. Dupraz, Corona, N.Y., assignors to Union Carbide Corporation, a corporation of New York
No Drawing. Filed Jan. 10, 1966, Ser. No. 519,464
Int. Cl. C07c 125/04
U.S. Cl. 260—482                                      14 Claims

ABSTRACT OF THE DISCLOSURE

An improved process for preparing a carbamate comprising reacting urea with an alcohol in contact with an aliphatic tertiary polyamine, such as, for example, triethylene diamine or N,N,N',N'-tetramethyl-1,3-butanediamine. As compared with prior art procedures involving reaction of urea with an alcohol in the absence of a catalyst or in the presence of metallic salt catalysts, this process provides decreased reaction time, improved yield and reduced formation of unwanted non-volatile by-products.

---

This invention relates to an improved process for the preparation of aliphatic monocarbamates. More particularly, this invention relates to new and useful improvements in the preparation of alkyl and alkoxyalkyl carbamates by reaction of urea with an alcohol.

Heretofore, carbamates have been prepared by the reaction of urea and an alcohol, both non-catalytically and in the presence of catalysts, including metal salts of carboxylic acids, such as zinc acetate or cupric acetate, and metal salts of inorganic acids, such as zinc chloride or cobalt chloride. In the absence of a catalyst, the reaction of urea with an alcohol requires a prolonged period for completion and is accompanied by the formation of large quantities of unwanted non-volatile by-products which lower the yield of carbamate, cause plugging of condensers and withdrawal lines, and materially increase the difficulty of isolating the product in pure form. Use of the metallic salt catalysts of the prior art results in a substantial decrease in the time required for completion of the reaction, but does not avoid the excessive formation of non-volatile by-products and the disadvantages concomitant therewith.

It is an object of this invention to provide an improved process for the preparation of carbamates. Another object of this invention is to provide a means of increasing the rate of reaction between urea and an alcohol to form a carbamate. A further object of this invention is to facilitate the reaction of urea with an alcohol to form a carbamate with minimum formation of non-volatile by-products. Another object of this invention is to increase the yield of carbamate resulting from the reaction of urea and an alcohol. Yet another object of this invention is to facilitate the isolation of a relatively pure carbamate from the products of the reaction of urea with an alcohol. A still further object of this invention is to minimize or eliminate the plugging of condensers and withdrawal lines with solid deposits during the reaction of urea and an alcohol to form a carbamate and/or during the recovery of the carbamate from the reaction mixture. These and other objects of the invention will become apparent to one skilled in the art in light of the following detailed disclosure and appended claims.

It has now been discovered that the preparation of aliphatic monocarbamates by reaction of urea

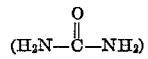

with an alcohol is materially improved by effecting the reaction of the urea and alcohol in contact with a tertiary amine. More specifically, it has been found that certain tertiary amines, as hereinafter described in greater detail, substantially decrease the time required for reaction of urea with an alcohol to produce an alkyl or alkoxyalkyl carbamate and, at the same time, greatly reduce or substantially eliminate the formation of non-volatile by-products, thereby increasing the yield of product, facilitating recovery of the product, and effectively avoiding the problems associated with the formation of solid deposits in processing equipment.

The reaction of urea and an aliphatic alcohol to form an aliphatic monocarbamate is illustrated by the preparation of n-butyl carbamate by reaction of urea and n-butanol in accordance with the following reaction equation:

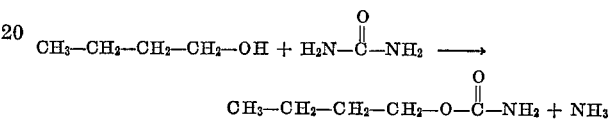

As is evident from the above equation, the reaction results in the release of one mole of ammonia for each mole of urea undergoing reaction, so that completion of the reaction is evidenced by the revolution of one mole of ammonia for each mole of urea charged. The reaction is ordinarily conducted by refluxing the mixture of urea and alcohol and continuously removing the ammonia released. However, the reaction is not a simple one and solid by-products, composed predominately of ammonium carbamate, are formed in large amounts. This not only results in decreased yield of the desired carbamate, but also in serious problems resulting from plugging of the reflux condenser and other equipment with solid deposits during the reaction and further plugging of condensers during isolation of the product by distillation.

Unexpectedly, it has now been found that the presence of a suitable tertiary amine, as hereinafter described, in the reaction system greatly reduces the tendency to form solid deposits and permits operation of the reaction on a commercial scale in good yield at satisfactory reaction rate, and without the need for expensive and elaborate means for avoiding plugging of the apparatus.

As hereinabove disclosed, the improved process of this invention comprises reacting urea with an aliphatic alcohol in contact with a tertiary amine. The alcohols of utility for the purposes of this invention are of the general formula:

$$R—O—(R'—O)_n—H$$

wherein R is an alkyl group of 1 to 8 carbon atoms, R' is an alkylene radical of 2 to 3 carbon atoms, and n is an integer having a value of from 0 to 10. Thus, the suitable alcohols include the alkanols containing 1 to 8 carbon atoms such as methyl alcohol, ethyl alcohol, n-propyl alcohol, isopropyl alcohol, n-butyl alcohol, isobutyl alcohol, n-amyl alcohol, n-hexyl alcohol, n-heptyl alcohol, n-octyl alcohol, and the like, and the glycol ethers containing up to 10 repeating oxyalkylene groups of either 2 or 3 carbon atoms, for example, the methyl, ethyl, butyl, isobutyl, hexyl and 2-ethylhexyl ethers of ethylene glycol, propylene glycol, diethylene glycol, dipropylene glycol, triethylene glycol, tripropylene glycol, polyethylene glycol, polypropylene glycol, and mixed polyethylene-polypropylene glycol.

The aliphatic monocarbamates resulting from the reaction of the above-described alcohols with urea are alkyl carbamates when the starting material is an alkanol, or alkoxyalkyl carbamates when the starting material is a glycol ether, and may be represented by the general formula:

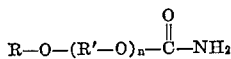

where R, R' and $n$ are as defined hereinabove. Illustrative of specific carbamates which can be prepared by the improved process of this invention there can be mentioned methyl carbamate, ethyl carbamate, n-butyl carbamate, 2-ethylhexyl carbamate, methoxyethyl carbamate, ethoxyethyl carbamate, n-butoxyethyl carbamate, isobutoxyethyl carbamate, methoxyethoxyethyl carbamate, methoxyethoxyethoxyethyl carbamate, methoxyisopropyl carbamate, methoxypropoxypropyl carbamate, isobutoxyethoxyethyl carbamate, and the like.

In accordance with this invention, the reaction of urea and an alcohol of the formula given hereinabove in contact with a tertiary amine may be conducted over a broad range of operating conditions. Ordinarily, the urea, which may be employed in crystalline or pelletized form as desired, is dissolved in the alcohol, the tertiary amine is added, and the mixture is refluxed for the period necessary to effect completion of the reaction. However, to ensure complete dissolution of the urea and/or to facilitate control of the reaction, an inert diluent may be employed. Suitable inert diluents include, among others, dimethylformamide, dimethylacetamide, 1,4-dioxane, and the dialkyl ethers of ethylene glycol. The reaction temperature can be in the range from about 100° C. to about 200° C., or higher, but is preferably in the range from about 125° C. to about 160° C. With the glycol ethers and the higher alkanols the reaction may be conducted at atmospheric pressure, but with the lower alkanols it may, in some instances, be necessary to employ pressure equipment in view of the relatively high temperatures required to promote the reaction.

The ratio of alcohol to urea may be varied over a broad range. As regards the lower limit, it is desirable to employ at least about one mole of alcohol per mole of urea since the presence of excess urea favors reaction of the urea with the carbamate to form an allophanate, and thus reduces the yield of desired product. The upper limit on the ratio of alcohol to urea is dictated largely by practical and economic considerations. In general, the yield of carbamate increases with increasing ratio of alcohol to urea, but the time required to complete the reaction is also increased. To a degree, the amount of alcohol employed will be determined by the extent to which urea is soluble in the particular alcohol and by whether or not an inert diluent is employed. A molar ratio of alcohol to urea of from about 1 to about 5 has been found to be generally suitable, while it is preferred to operate with a molar ratio of from about 1.5 to about 3.

The time required to complete the reaction is dependent upon various factors such as the particular alcohol and tertiary amine employed, the ratio of alcohol to urea, the concentration of tertiary amine in the reaction mixture, and the reaction temperature. The factor which is most determinative of the reaction time is the amount of tertiary amine employed, it having been found that the reaction rate is ordinarily strongly dependent on the concentration of tertiary amine, and increases with increasing concentration. Depending on the conditions employed, completion of the reaction may require as little as about 2 hours or as much as about 20 hours, or more.

The teritary amines which have been found to promote the reaction of urea with an alcohol to form an aliphatic monocarbamate are the aliphatic tertiary polyamines of either cyclic or acyclic structure. By the term "tertiary polyamine," as employed herein, is meant an amine containing two or more tertiary amine groups

The aliphatic tertiary polyamines are high boiling compounds and it is preferred in effecting the reaction of urea with a particular alcohol that the aliphatic tertiary polyamine employed have a boiling point which is at least as great as the boiling point of the initial reaction mixture, i.e., the starting mixture of alcohol, urea, tertiary amine and, if used, the inert diluent. The preferred aliphatic tertiary polyamines for the purposes of this invention are (1) triethylenediamine, which has the formula:

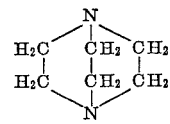

and a boiling point of 174° C., (2) N,N,N',N'-tetramethyl-1,3,-butanediamine, which has the formula:

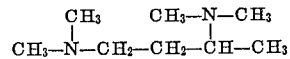

and a boiling point of 165° C., and (3) bis(2-dimethylaminoethyl)-ether which has the formula:

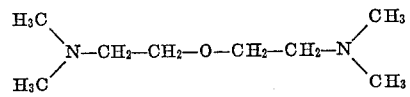

and a boiling point of 189° C. Illustrative of other aliphatic tertiary polyamines that can be employed in this invention there can be mentioned N,N,N',N'-tetraethyl-1,3 - butanediamine, N,N,N',N'-tetrabutyl-1,3-propanediamine, N,N,N',N' - tetramethylethylenediamine, pentamethyldiethylenetriamine, and the like.

The amount of the tertiary amine that is employed can be varied broadly. The lower limit is any amount which is effective to promote the reaction of the urea with the alcohol to form the carbamate, that is, any catalytically effective amount. The upper limit is dictated solely by practical and economic considerations. As hereinbefore disclosed, increasing the content of tertiary amine in the reaction mixture will result in substantial decrease in the time required to complete the reaction. Moreover, the advantage of decreased reaction time is ordinarily achieved with only a moderate resulting decrease in the yield of the carbamate. Generally speaking, the tertiary amine should be employed in an amount of from about 0.01 to about 1.5 parts of tertiary amine per part of urea by weight, and preferably from about 0.1 to about 0.5 part. Larger amounts of the tertiary amine would not be detrimental and, in fact, it can be employed in large excess so as to serve as both diluent and promoter, but, ordinarily, economic considerations would dictate using amounts of tertiary amine toward the lower end of the range specified above.

In a preferred embodiment of the present invention, the unused alcohol and the tertiary amine are recovered and reused. Any suitable conventional procedure for recovery of these materials may be employed. For example, the carbamate may be isolated from the reaction mixture by distillation techniques, with the alcohol and the tertiary amine being recovered as the initial distillate fraction. Since the tertiary amine does not take part in the reaction and since the reaction conditions are not such as to result in significant degradation thereof, it may be almost completely recovered for reuse, for example, recovery of 95 percent or more of the tertiary amine can usually be achieved without undue difficulty.

The invention is further illustrated by the following specific examples of its practice.

Example 1

To a 3-necked round bottom flask, equipped with a thermometer and reflux condenser, there were charged 1520 grams (20 moles) of ethylene glycol monomethyl ether (CH$_3$OC$_2$H$_4$OH), 600 grams (10 moles) of urea, and 32 grams of triethylenediamine. The mixture was refluxed with ammonia evolution and after a period of 9 hours the theoretical amount of ammonia had evolved, evidencing completion of the reaction. The reflux condenser remained essentially free of ammonium carbamate deposits throughout the reaction period. Upon distillation of the reaction mixture under reduced pressure there were recovered 845 grams of methoxyethyl carbamate, corresponding to a yield of 71 percent of theoretical based on urea.

In contrast, where the identical experiment was carried out except that the triethylenediamine was replaced with 25 grams of zinc acetate $[Zn(OOCCH_3)_2 \cdot 2H_2O]$ the period for completion of the reaction was 7 hours, but the yield of methoxyethyl carbamate was only 41 percent of theoretical based on urea and during the reaction a large amount of ammonium carbamate caked on the reflux condenser, necessitating periodic cleaning thereof.

Example 2

Methoxyethyl carbamate was produced by the reaction of urea with ethylene glycol monomethyl ether in contact with triethylenediamine under the reaction conditions and with the results set forth in Table 1 below. In each case, the mixture was refluxed until the reaction was complete, as evidenced by evolution of the theoretical amount of ammonia, and little or no formation of deposits in the reflux condenser occurred.

Example 4

A mixture of 296 grams (4 moles) of n-butanol, 180 grams (3 moles) of urea, 180 grams of dimethylformamide, and 20.4 grams of triethylenediamine was refluxed until the theoretical amount of ammonia had been evolved (6 hours). During the refluxing only a slight deposit of ammonium carbamate formed in the condenser. Distillation of the reaction mixture under reduced pressure resulted in the recovery of 221 grams of n-butyl carbamate, corresponding to a yield of 63 percent of theoretical based on urea.

When the identical experiment was carried out except that the triethylenediamine was replaced with 8 grams of zinc acetate, the time for completion of the reaction was 8.5 hours, the yield of n-butyl carbamate was 54 percent of theoretical based on urea, and the reaction had to be interrupted twice to clean reflux condensers which were almost completely plugged with ammonium carbamate.

Example 5

A mixture of 222 grams (3 moles) of isobutanol, 60 grams (1 mole) of urea, 222 grams of dimethylformamide, and 8.5 grams of triethylenediamine was refluxed for a period of 18 hours with only slight formation of solid deposits in the condenser. Distillation of the reaction mixture under reduced pressure resulted in the

TABLE I

| Run No. | Ethylene glycol monomethyl ether (grams) | Urea (grams) | Triethylenediamine (grams) | Parts of Amine Per Part of Urea by Weight | Molar Ratio of Alcohol to Urea | Reaction Time (hours) | Yield (percent of theoretical based on urea) |
|---|---|---|---|---|---|---|---|
| 2-A | 456 | 120 | 13.5 | 0.112 | 3 | 8.5 | 80 |
| 2-B | 1,824 | 480 | 54.4 | 0.113 | 3 | 11 | 78.5 |
| 2-C | 1,520 | 600 | 68 | 0.113 | 2 | 8 | 70.6 |
| 2-D | 2,584 | 1,020 | 58 | 0.057 | 2 | 11 | 75.8 |
| 2-E | 1,520 | 600 | 15 | 0.025 | 2 | 13 | 68 |
| 2-F | 1,520 | 600 | 8.5 | 0.014 | 2 | 13.5 | 63 |
| 2-G | 1,140 | 600 | 30 | 0.050 | 1.5 | 8 | 63 |

Run 2-A was repeated under identical conditions except that the triethylenediamine was omitted from the reaction mixture, i.e., the reaction was carried out without using any catalyst. The result was a reaction time of 17.5 hours, a yield of methoxyethyl carbamate of 40 percent of theoretical based on urea, and the formation of excessive deposits in the condensers during both the reflux and distillation steps.

Run 2-E was repeated under identical conditions except that the triethylenediamine was replaced with 25 grams of zinc acetate. Although the reaction time was only 7 hours in this instance, the yield of methoxyethyl carbamate was only 41 percent of theoretical based on urea, and there was formation of excessive deposits in the condensers during both the reflux and distillation steps.

Example 3

Methoxyethyl carbamate was produced by the reaction of urea with ethylene glycol monomethyl ether in contact with N,N,N′,N′-tetramethyl-1,3-butanediamine under the reaction conditions and with the results set forth in Table II below. In each case, the mixture was refluxed until the reaction was complete, as evidenced by the evolution of the theoretical amount of ammonia, and little or no formation of deposits in the reflux condenser occurred.

recovery of 83 grams of isobutyl carbamate, corresponding to a yield of 71 percent of theoretical based on urea.

Example 6

A mixture of 204 grams (2 moles) of 2-ethylbutanol, 60 grams (1 mole) of urea, 204 grams of dimethylformamide and 7.9 grams of triethylenediamine was refluxed for a period of 13 hours with only slight formation of solid deposits in the condenser. Distillation of the reaction mixture under reduced pressure resulted in the recovery of 89 grams of 2-ethylbutyl carbamate, corresponding to a yield of 61 percent of theoretical based on urea.

Example 7

A mixture of 260 grams (2 moles) of 2-ethylhexanol, 60 grams (1 mole) of urea, 260 grams of dimethylformamide, and 9.6 grams of triethylenediamine was refluxed for a period of 13 hours with only slight formation of solid deposits in the condenser. Distillation of the reaction mixture under reduced pressure resulted in the recovery of 103 grams of 2-ethylhexyl carbamate, corresponding to a yield of 60 percent of theoretical based on urea.

TABLE II

| Run No. | Ethylene glycol monomethyl ether (grams) | Urea (grams) | N,N,N′,N′-tetramethyl-1,3-butane-diamine (grams) | Parts of Amine Per Part of Urea by Weight | Molar Ratio of Alcohol to Urea | Reaction Time (hours) | Yield (percent of theoretical based on urea) |
|---|---|---|---|---|---|---|---|
| 3-A | 1,520 | 600 | 21 | 0.035 | 2 | 14 | 61 |
| 3-B | 1,520 | 600 | 41 | 0.068 | 2 | 11 | 59 |
| 3-C | 1,520 | 600 | 64 | 0.107 | 2 | 11 | 75 |
| 3-D | 2,280 | 600 | 41 | 0.068 | 3 | 14 | 72 |
| 3-E | 1,520 | 600 | 212 | 0.354 | 2 | 6.5 | 72 |
| 3-F | 1,520 | 600 | 420 | 0.70 | 2 | 4.25 | 75 |
| 3-G | 692 | 360 | 432 | 1.20 | 1.5 | 3 | 66 |

Example 8

A mixture of 590 grams (5 moles) of the isobutyl monoether of ethylene glycol [(CH₃)₂C₂H₃OC₂H₄OH)], 150 grams (2.5 moles) of urea, and 16 grams of N,N,N',N'-tetramethyl-1,3-butanediamine was refluxed until the theoretical amount of ammonia had been evolved (2 hours). During the refluxing only a slight deposit of ammonium carbamate formed in the condenser. The reaction mixture was cooled, resulting in the formation of a small amount of crystalline material which settled rapidly, and then filtered, and the filtrate was distilled under reduced pressure. A total of 257 grams of isobutoxyethyl carbamate was recovered, corresponding to a yield of 64 percent of theoretical based on urea.

When the identical experiment was carried out except that the N,N,N',N'-tetramethyl-1,3-butanediamine was replaced with 6.25 grams of zinc acetate, the reflux condenser was almost completely plugged with ammonium carbamate and, upon cooling, the reaction mixture became opaque due to the formation of a large quantity of a finely divided white solid. The reaction was completed in a period of 2 hours, but the yield of isobutoxyethyl carbamate was only 47 percent of theoretical based on urea.

Example 9

Methoxyethyl carbamate was produced by the reaction of urea with ethylene glycol monomethyl ether in contact with bis(2-dimethylaminoethyl)ether under the reaction conditions and with the results set forth in Table III below. In each case, the mixture was refluxed until the reaction was complete, as evidenced by evolution of the theoretical amount of ammonia, and little or no formation of deposits in the reflux condenser occurred.

Example 12

A mixture of 164 grams (1 mole) of methoxytriglycol (CH₃O[C₂H₄O]₃H), 60 grams (1 mole) of urea, and 1.5 grams of triethylenediamine was refluxed until the theoretical amount of ammonia had been evolved (2 hours). During the refluxing only a slight deposit of ammonium carbamate in the condenser was observed. Distillation of the reaction mixture under reduced pressure resulted in the recovery of 65 grams of methoxyethoxyethoxyethyl carbamate, corresponding to a yield of 31 percent of theoretical based on urea.

It is to be noted that, as evidenced by the examples herein, the yield of carbamate obtained in the process of this invention is strongly dependent upon the particular alcohol employed. However, regardless of the alcohol which is used or the yield obtained, the reaction can in every instance be effected without excessive formation of non-volatile by-products, and resulting plugging of equipment, by the incorporation of an aliphatic tertiary polyamine in the reaction mixture in accordance with the teachings hereinbefore set forth.

Although the invention has been illustrated by the preceding examples, it is not to be construed as limited to the materials employed therein, but rather the invention encompasses the generic area as hereinbefore disclosed. Various modifications and embodiments of the invention can be made without departing from the spirit and scope thereof.

What is claimed is:

1. A method of preparing a carbamate which comprises reacting urea with an alcohol of the general formula:

$$R-O-(R'-O)_n-H$$

TABLE III

| Run No. | Ethylene glycol monomethyl ether (grams) | Urea (grams) | Bis(2-dimethyl-amino-ethyl) ether (grams) | Molar Ratio of Alcohol to Urea | Parts of Amine Per Part of Urea by Weight | Reaction Time (hours) | Yield (percent of theoretical based on urea) |
|---|---|---|---|---|---|---|---|
| 9-A | 1,520 | 600 | 71 | 2 | 0.118 | 12.5 | 74 |
| 9-B | 304 | 120 | 160 | 2 | 1.33 | 2.5 | 66 |
| 9-C | 689 | 360 | 480 | 1.5 | 1.33 | 3.25 | 69 |

Example 10

A mixture of 890 grams (10 moles) of 1-methoxypropanol-2

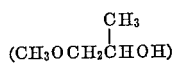

300 grams (5 moles) of urea, and 35.7 grams of N,N,N',N'-tetramethyl-1,3-butanediamine was refluxed until the theoretical amount of ammonia had been evolved (10 hours). During the refluxing only a slight deposit of ammonium carbamate in the condenser was observed. Distillation of the reaction mixture under reduced pressure resulted in the recovery of 113 grams of methoxyisopropyl carbamate, corresponding to a yield of 17 percent of theoretical based on urea.

Example 11

A mixture of 360 grams (3 moles) of diethylene glycol monomethyl ether (CH₃O[C₂H₄O]₂H), 90 grams (1.5 moles) of urea, and 2.2 grams of triethylenediamine was refluxed until the theoretical amount of ammonia had been evolved (1 hour). During the refluxing only a slight deposit of ammonium carbamate in the condenser was observed. Distillation of the reaction mixture under reduced pressure resulted in the recovery of 73 grams of methoxyethoxyethyl carbamate, corresponding to a yield of 35 percent of theoretical based on urea.

wherein R is an alkyl group of 1 to 8 carbon atoms, R' is an alkylene radical of 2 to 3 carbon atoms, and $n$ is an integer having a value of from 0 to 10 at a temperature of at least about 100° C. and at a molar ratio of alcohol to urea of at least 1.5, in contact with a catalytically effective amount of an aliphatic tertiary polyamine.

2. The method of claim 1 wherein the aliphatic tertiary polyamine which is employed has a boiling point at least as great as the boiling point of the initial reaction mixture.

3. The method of claim 1 wherein the aliphatic tertiary polyamine is triethylenediamine.

4. The method of claim 1 wherein the aliphatic tertiary polyamine is N,N,N',N'-tetramethyl-1,3-butanediamine.

5. The method of claim 1 wherein the aliphatic tertiary polyamine is bis(2-dimethylaminoethyl)ether.

6. The method of claim 1 wherein the reaction is effected at a temperature of from about 125° C. to about 160° C.

7. The method of claim 1 wherein the molar ratio of alcohol to urea is from about 1.5 to about 5.

8. The method of claim 1 wherein the molar ratio of alcohol to urea is from about 1.5 to about 3.

9. The method of claim 1 wherein the amount of aliphatic tertiary polyamine is from about 0.01 to about 1.5 parts per part of urea by weight.

10. The method of claim 1 wherein the amount of aliphatic tertiary polyamine is from about 0.1 to about 0.5 part per part of urea by weight.

11. The method of claim 1 wherein the alcohol is ethylene glycol monomethyl ether.

12. The method of claim 1 wherein the alcohol is diethylene glycol monomethyl ether.

13. The method of claim 1 wherein the alcohol is 1-methoxypropanol-2.

14. A method of preparing methoxyethyl carbamate which comprises refluxing urea with ethylene glycol monomethyl ether, at a ratio of about 1.5 to about 3 moles of ethylene glycol monomethyl ether per mole of urea, in contact with triethylenediamine in an amount of about 0.1 to about 0.5 part per part of urea by weight.

References Cited

UNITED STATES PATENTS

| | | | |
|---|---|---|---|
| 2,197,479 | 4/1940 | Meigs | 260—482 |
| 2,834,799 | 5/1958 | Sowa | 260—482 XR |
| 3,013,064 | 12/1961 | Beinfest et al. | 260—482 |
| 2,871,259 | 1/1959 | Levy | 260—482 |
| 3,013,064 | 12/1961 | Beinfest et al. | 260—482 |

FOREIGN PATENTS

| | | |
|---|---|---|
| 984,084 | 2/1965 | Great Britain. |

LORRAINE A. WEINBERGER, *Primary Examiner.*

ALBERT P. HALLUIN, *Assistant Examiner.*